United States Patent

Herget

(10) Patent No.: US 9,361,921 B2
(45) Date of Patent: *Jun. 7, 2016

(54) TAPE SERVO TRACK WRITE COMPENSATION

(71) Applicant: GLOBALFOUNDRIES INC., Grand Cayman (KY)

(72) Inventor: Philipp Herget, San Jose, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/738,025

(22) Filed: Jun. 12, 2015

(65) Prior Publication Data

US 2015/0279397 A1 Oct. 1, 2015

Related U.S. Application Data

(60) Continuation of application No. 14/547,504, filed on Nov. 19, 2014, now Pat. No. 9,087,538, which is a division of application No. 14/132,195, filed on Dec. 18, 2013, now Pat. No. 8,937,786.

(51) Int. Cl.
G11B 5/02 (2006.01)
G11B 5/584 (2006.01)
G11B 5/48 (2006.01)
G11B 20/12 (2006.01)

(52) U.S. Cl.
CPC .............. *G11B 5/584* (2013.01); *G11B 5/4893* (2013.01); *G11B 20/1201* (2013.01)

(58) Field of Classification Search
None
See application file for complete search history.

(56) References Cited

U.S. PATENT DOCUMENTS

| | | |
|---|---|---|
| 4,996,609 A | 2/1991 | Joannou |
| 5,629,813 A | 5/1997 | Baca et al. |
| 6,222,698 B1 | 4/2001 | Barndt et al. |
| 6,563,659 B1 | 5/2003 | Fasen |
| 6,674,603 B2 | 1/2004 | Basham et al. |
| 6,700,729 B1 | 3/2004 | Beck et al. |
| 6,903,895 B2 | 6/2005 | Chliwnyj et al. |
| 7,724,466 B2 | 5/2010 | Bui et al. |
| 7,889,454 B2 | 2/2011 | Johnson et al. |
| 8,169,736 B2 | 5/2012 | Bui et al. |
| 8,937,786 B1 | 1/2015 | Herget |
| 2005/0219734 A1 | 10/2005 | Rothermel et al. |
| 2006/0066977 A1 | 3/2006 | Tada |
| 2009/0219648 A1 | 9/2009 | Jaquette |
| 2009/0316290 A1 | 12/2009 | Biskeborn et al. |
| 2011/0199702 A1 | 8/2011 | Hoerger |
| 2012/0188665 A1 | 7/2012 | Biskeborn et al. |
| 2012/0206832 A1 | 8/2012 | Hamidi et al. |
| 2012/0314322 A1 | 12/2012 | Olson et al. |
| 2014/0139944 A1 | 5/2014 | Johnson et al. |
| 2015/0170692 A1* | 6/2015 | Herget ............................ 360/75 |

OTHER PUBLICATIONS

U.S. Appl. No. 14/547,504, titled "Tape Servo Track Write Compensation," filed Nov. 19, 2014, pp. 1-36.

\* cited by examiner

*Primary Examiner* — Thang Tran
(74) *Attorney, Agent, or Firm* — Anthony Canale; Andrew M. Calderon; Roberts Mlotkowski Safran & Cole, P.C.

(57) ABSTRACT

Recording a servo write head spacing for writing servo tracks on a magnetic tape in a manufacturing environment. One or more environmental condition measurements of the manufacturing environment are received by a computer. A pair of servo tracks is written on a magnetic tape by a pair of servo write heads at a nominal spacing. The one or more environmental condition measurements of the manufacturing environment and information pertaining to the spacing of the servo tracks on the magnetic tape are recorded in one or more data stores.

8 Claims, 10 Drawing Sheets

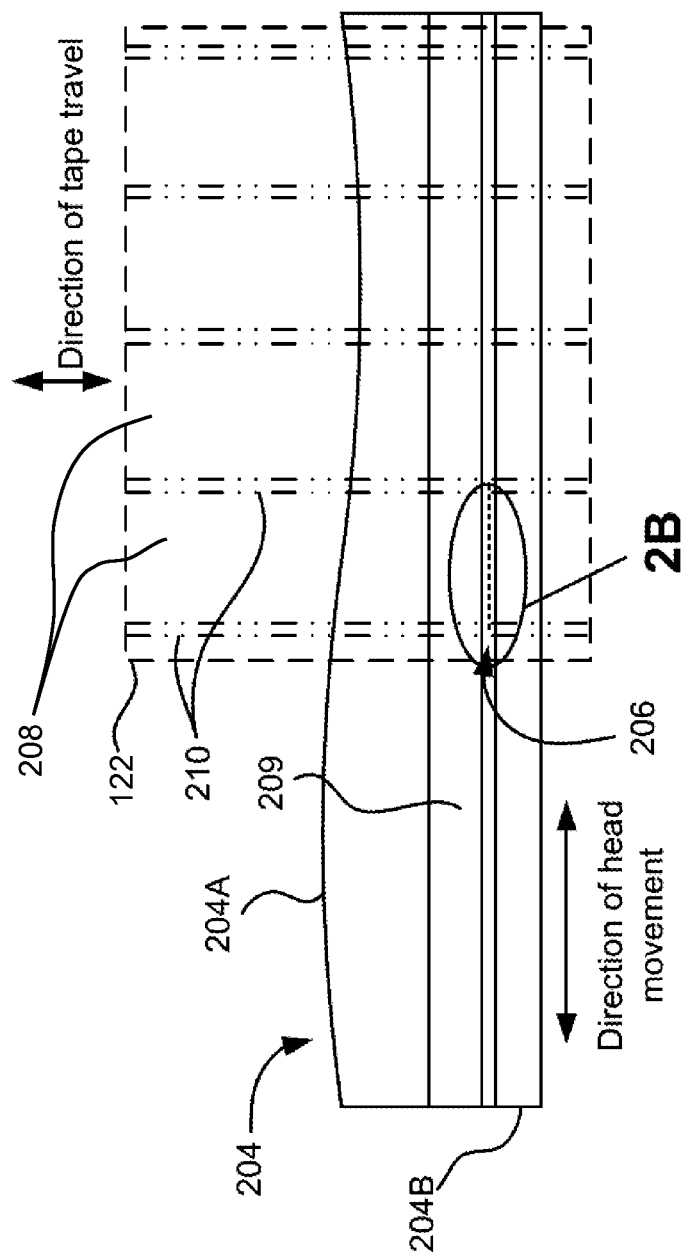

TAPE SERVO TRACK WRITE COMPENSATION

FIELD OF THE INVENTION

The present invention relates generally to the field of magnetic information storage and retrieval, and more particularly to automatically compensating for manufacturing environmental changes when writing servo patterns to magnetic tape.

BACKGROUND OF THE INVENTION

As densities for linear tape storage systems increase due to advancements in materials and storage schemes, precision alignment of the tape heads to data and servo tracks is an increasingly challenging requirement for accurate recording and reading of stored data. At high track densities, alignment is affected by changes in tape width due to environmental conditions, such as temperature and humidity, and mechanical stress to the tape, which can cause the lateral spacing of the data tracks in a data band to shrink or expand. Generally, increasing the temperature or humidity will cause expansion of the tape width, and applying longitudinal stress to the tape will cause tension narrowing of the tape width. Changes to the lateral spacing of the data and servo tracks may result in a misalignment of the tape head elements on the tape head assembly, such as read and write heads, with the data and servo tracks on the tape. Depending on the latitudinal density of data tracks and the coefficients of thermal and hygroscopic expansion of the tape substrate material, the degree of expansion under certain environmental conditions may cause the lateral spacing of the data and servo tracks under the read heads of the tape head assembly to expand to the point where not all tracks can be read by the tape heads.

One method of adjusting for the effects of changes to tape width while recording and reading data is to change the relative spacing of the read and write elements with respect to the tape by adjusting the tape head azimuth angle. Another method is to change the longitudinal tension on the tape, causing a corresponding change to the lateral dimension of the tape due to tension narrowing of the tape. To facilitate this adjustment, a pair of servo tracks can be used to measure the physical width of the tape relative to that of the two servo elements.

Correct read and write element spacing relative to the data tracks in the presence of changing tape width may be maintained by a feedback control system. Such a control system may require both a method of determining the relative spacing, and an established reference value, or servo set point. One method of determining the relative spacing makes use of servo patterns written in the servo bands on either side of data bands during manufacturing. The servo patterns typically consist of magnetic transitions with two different azimuthal slopes, such as a chevron pattern, that are read by a pair of servo read heads located on the tape head. The servo read head lateral-position relative to a servo track is derived from the relative timing of pulses read by the servo read head while reading the servo pattern. Reference signals for feedback control can then be chosen with respect to the spacing computed from the servo patterns. For example, the control system could adjust the azimuth angle of the tape head assembly or the tape tension such that both servo read heads track in the center of their respective servo patterns, and thus properly adjust the read head spacing relative to the data tracks. If the servo spacing changes while the tape is running in the tape drive unit, the servo feedback control system can compensate for these changes.

A number of factors can contribute to differences in servo pattern spacing. During manufacturing of the tape, the pattern width may be affected by the environmental conditions during the writing of the servo patterns. Further variation may be introduced by tolerances in constructing the servo writer head, which will also lead to differences in servo pattern spacing. Additionally, aging of the tape causes the servo pattern spacing to change over time. This change is typically non-uniform due to the differences in pack pressure, or how tightly wound the tape is, within the tape cartridge. For example, tape at the inner diameters of the cartridge typically become wider than tape at the outer diameters due to these differences in pack pressure.

SUMMARY

In one embodiment, a first method for setting a servo write head spacing for writing servo tracks on a magnetic tape in a manufacturing environment is disclosed. One or more processors receive one or more environmental condition measurements of the manufacturing environment. The processors determine a spacing for a pair of servo write heads based at least on a nominal spacing for the pair of servo tracks, and a product of a difference between one or more nominal environmental conditions associated with the nominal spacing and corresponding one or more of the environmental condition measurements of the manufacturing environment, and one or more coefficients of expansion for the magnetic tape. Spacing for the pair of servo write heads is set to the determined spacing, such that the spacing of the pair of servo write heads is substantially the nominal spacing when the one or more manufacturing environment environmental condition measurements are the one or more nominal environmental conditions.

In another embodiment, a second method for setting a servo write head spacing for writing servo tracks on a magnetic tape in a manufacturing environment is disclosed. One or more processors receive one or more environmental condition measurements of the manufacturing environment. A spacing of a pair of servo write heads is set to a nominal spacing. The one or more environmental condition measurements of the manufacturing environment, and one or more coefficients of expansion for the magnetic tape that are associated with the one or more environmental condition measurements of the manufacturing environment are recorded in one or more data stores.

In another embodiment, a tape drive system is disclosed. One or more environmental condition sensors generate one or more signals corresponding to a temperature and/or humidity in an operating environment of a pair of servo read heads of a tape drive system. A controller operates to read data associated with a magnetic tape, to determine a spacing set point for the pair of servo read heads based at least on the data and the one or more signals from the environmental sensors, and to generate a control signal corresponding to the determined set point. An actuator coupled to the pair of servo read heads to adjusts the spacing of the pair of servo read heads to the set point based on the control signal.

BRIEF DESCRIPTION OF THE SEVERAL VIEWS OF THE DRAWINGS

FIG. 2A is a plan view of a tape bearing surface of the tape head of FIG. 2, in accordance with an embodiment of the present invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

An embodiment of the present invention generally describes a method and apparatus for setting the spacing of servo write heads such that there is a nominal lateral spacing between the servo tracks at the nominal operating temperature and humidity associated with the nominal spacing. Coefficients of thermal and hygroscopic expansion for the tape and tape head substrate materials, and the manufacturing environment temperature and humidity, may be used to determine the servo write head spacing during manufacturing such that at the nominal temperature and humidity, the servo track spacing will be at the nominal value. The nominal servo track width, the tape coefficients, and the tape manufacturing date are written to, for example, the tape, or media auxiliary memory of the tape cartridge containing the tape. At data read/write in a target environment, a tape drive determines a servo set point based on the nominal servo track width, the difference between the nominal temperature and humidity and the target operating environment temperature and humidity, the tape coefficients, and tape head coefficients.

In another embodiment, the servo write head spacing is set to, for example, the nominal lateral spacing regardless of the manufacturing environment temperature and humidity. The information related to the nominal servo track width, the manufacturing environment temperature and humidity, the tape and tape head coefficients, and the tape manufacturing date may be written to, for example, the tape, or media auxiliary memory of the tape cartridge containing the tape. At data read/write in a target environment, a tape drive determines a servo set point based on the nominal servo track width, the difference between the manufacturing environment temperature and humidity and the target operating environment temperature and humidity, and the tape and tape head coefficients.

Figure 1:
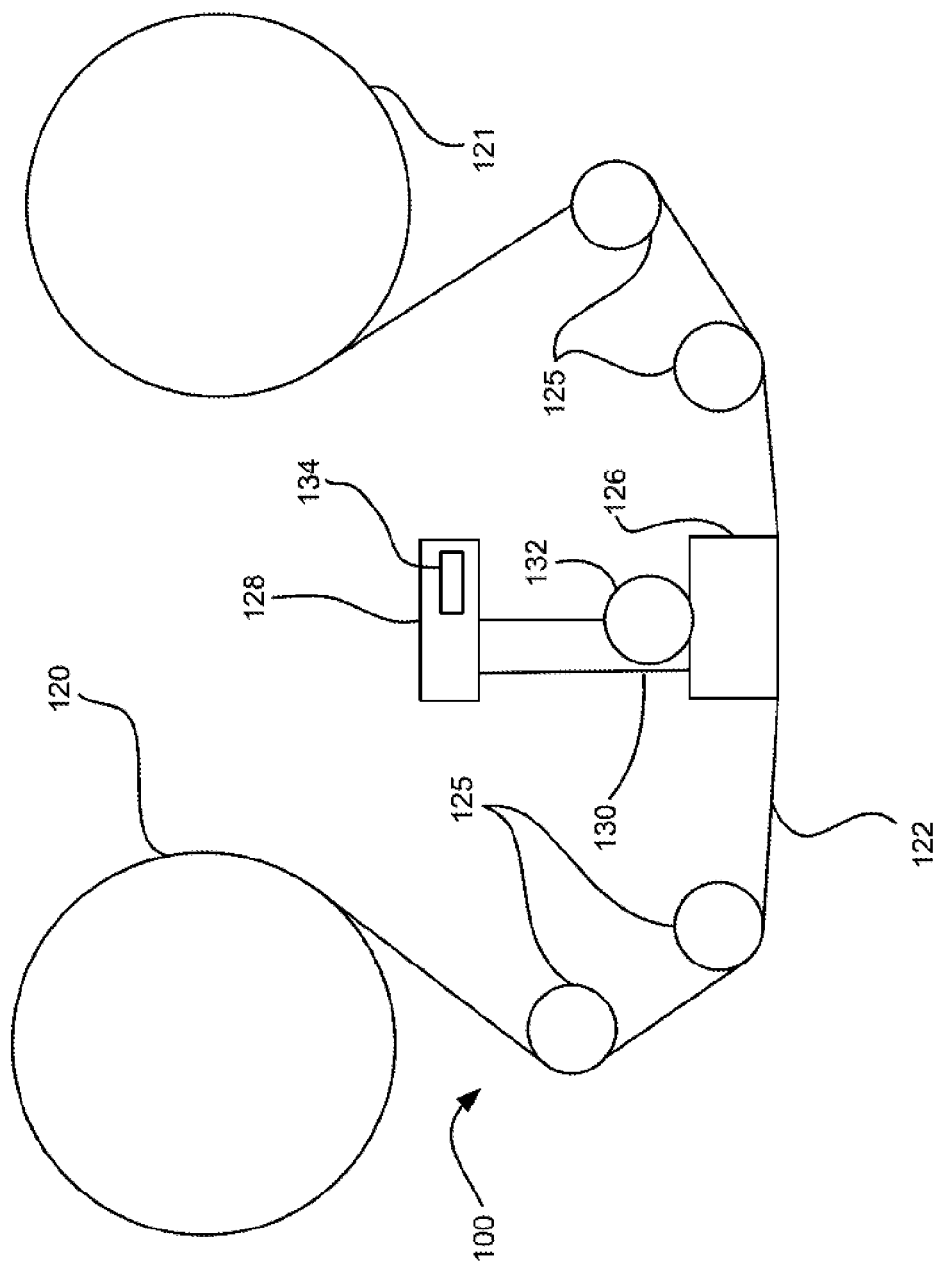
FIG. 1 is a simplified component view of tape drive, in accordance with an embodiment of the present invention.

FIG. 1 illustrates a simplified tape drive 100 of a tape-based data storage system, in accordance with an embodiment of the present invention. While one specific implementation of a tape drive is shown in FIG. 1, it should be noted that the embodiments described herein may be implemented in the context of any type of tape drive system.

As shown, tape supply cartridge 120 and take-up reel 121 are provided to support a tape 122. One or more of the reels may form part of a removable cassette and are not necessarily part of tape drive 100. Tape drive 100 typically includes drive motors (not shown) to drive tape supply cartridge 120 and take-up reel 121 to move tape 122 over a tape head 126 of any type.

Guides 125 guide tape 122 across tape head 126. Tape head 126 is in turn coupled to a tape controller 128 via a cable 130. In exemplary embodiments, tape controller 128 at least controls certain functions of tape head 126, such as servo track writing during tape manufacturing, servo following, data writing, data reading, etc. Cable 130 may include read/write circuits to transmit data to tape head 126 to be recorded on the tape 122 and to receive data read by tape head 126 from the tape 122. An actuator 132 controls the positioning of tape head 126 relative to tape 122.

An interface 134 may also be provided for communication between tape drive 100 and a host computing system (integral or external) to send and receive data and for controlling the operation of the tape drive and communicating the status of the tape drive to the host computing system, as will be understood by those of skill in the art.

Tape drive 100 may also include environmental sensors (not shown) that monitor the temperature and humidity in the environment of tape head 126. For example, sensors may be placed in proximity to tape head 126, or within an enclosure that contains tape drive 100. The sensors may communicate, for example, to the host computing system via interface 134.

Figure 2:
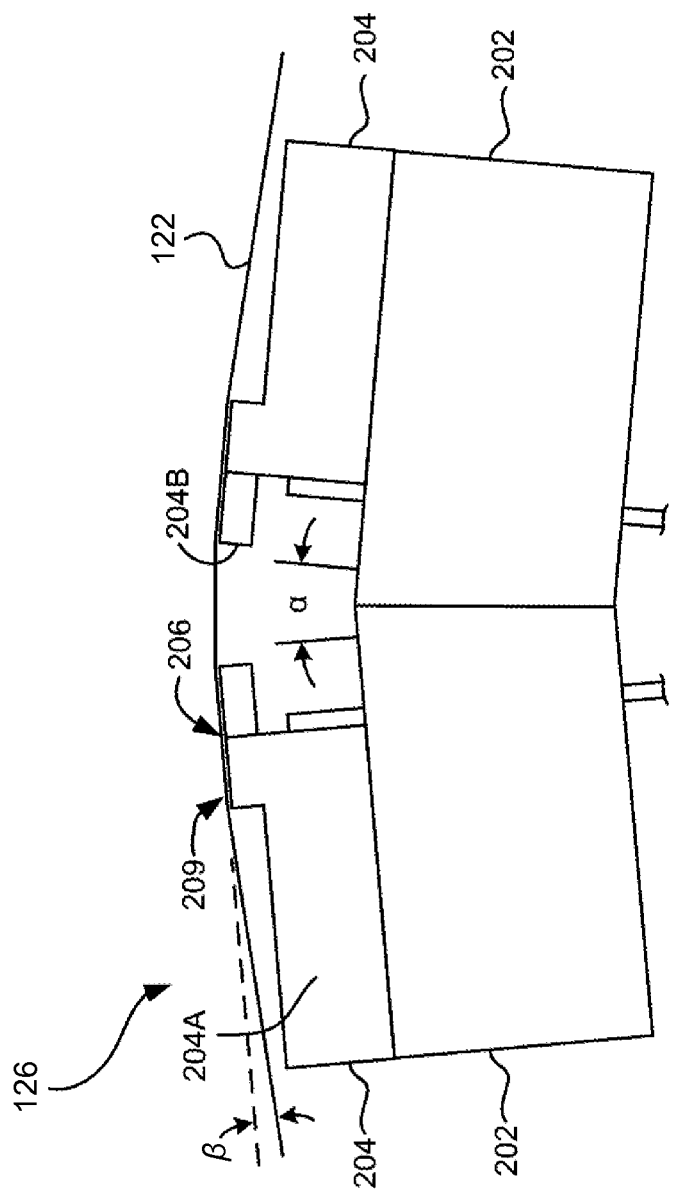
FIG. 2 is a side view of a tape head of the tape drive of FIG. 1, in accordance with an embodiment of the present invention.

FIG. 2 illustrates a side view of an exemplary embodiment of tape head 126 of FIG. 1, in accordance with an embodiment of the present invention. In the exemplary embodiment, tape head 126 is a flat-lapped, bi-directional, two-module magnetic tape head. Note that in various embodiments of the present invention, other configurations may be used, which themselves may include components similar to and/or different than those shown in FIG. 2, as will be apparent to one skilled in the art. Tape head 126 includes a pair of modules, each comprised of a base 202, bonded to a chip 204. Each chip 204 includes a substrate 204A and a closure 204B with a thin film portion, commonly referred to as a "gap" in which the read and/or write heads 206 are formed. The bases 202 are typically "U-beams" which provide space for a cable in the center and allow adhesive bonding near the edges of the U. The U-Beam bases are bonded together at a small angle α with respect to each other. After bonding, the two modules form a single physical unit to provide read-while-write capability by activating the write heads of the leading module and read heads of the trailing module aligned with the write heads of the leading module parallel to the direction of tape travel. In operation, tape 122 is moved over chips 204 along tape bearing surfaces 209 for reading and writing data on tape 122 using read and/or write heads 206. The wrap angle fi of tape 126 at edges going onto and exiting the flat tape bearing surfaces 209 are usually between ⅛ degree and 4½ degrees. Substrates 204A and closures 204B of chip 204 are typically constructed of a wear resistant material, such as a ceramic.

FIG. 2A illustrates a plan view of tape bearing surface 209 of a chip 204 from the perspective of looking down upon tape bearing surface 209 of FIG. 2. A representative tape 122 is shown in dashed lines. In this exemplary embodiment, tape 122 includes four data bands 208, and five servo tracks 210 on a one-half inch wide tape 122. Data bands 208 are defined between servo tracks 210. Each data band 208 may include a number of data tracks, for example 96 data tracks (not shown). During read/write operations, read and/or write heads 206 are positioned within one of the data bands 208. Servo read heads read servo tracks 210. During tape manufacturing, servo write heads write the servo tracks 210 to tape 122. Servo signals generated when servo read heads read servo tracks 210 may be used to keep read and/or write heads 206 aligned with data tracks in a particular data band 208 during read/write operations. Chip 204 is preferably long enough to be able to support tape 122 as the head steps between data bands.

Figure 2B:
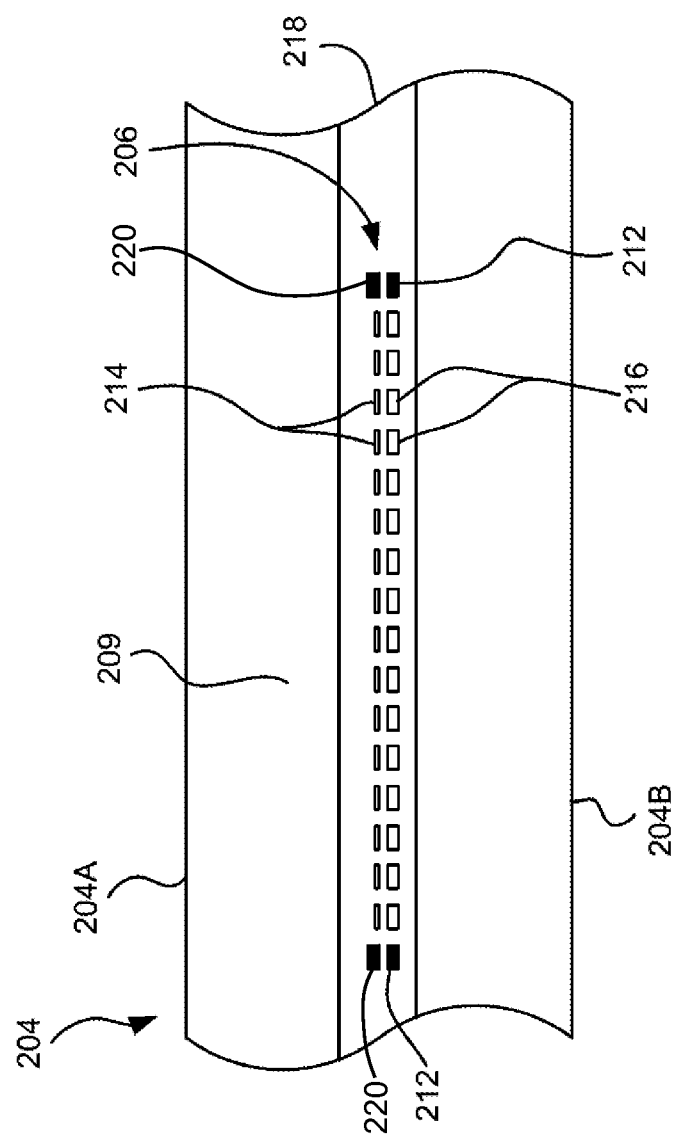
FIG. 2B is a detailed view of the read and/or write heads of the tape head of FIG. 2, in accordance with an embodiment of the present invention.

FIG. 2B depicts a plurality of read and/or write heads 206 formed in a gap 218 on a chip 204 in Circle 2B of FIG. 2A. As shown, the array of read and/or write heads 206 includes, for example, 16 data write heads 214, 16 data read heads 216, two servo read heads 212, and two servo write heads 220, though the number of elements may vary. While the read and/or write heads 206 may be arranged in a piggyback configuration as shown in FIG. 2B, data read heads 216 and data write heads 214 may also be arranged in an interleaved configuration. Alternatively, each array of read and/or write heads 206 may be data read heads or data write heads only, and the arrays may contain one or more servo read heads 212 or servo write heads 220. As noted by considering FIGS. 2, 2A, and 2B together, each chip 204 may include a complementary set of read and/or write heads 206 for such things as bi-directional reading and writing, read-while-write capability, backward compatibility, etc. In general, the data read heads 216 on one chip 204 are aligned with the data write heads 214 on the opposite chip 204, such that data written by one module can subsequently be read by the second module as the tape moves from one module to the second module. Any of these arrays may contain one or more servo read heads 212.

Figure 3A:
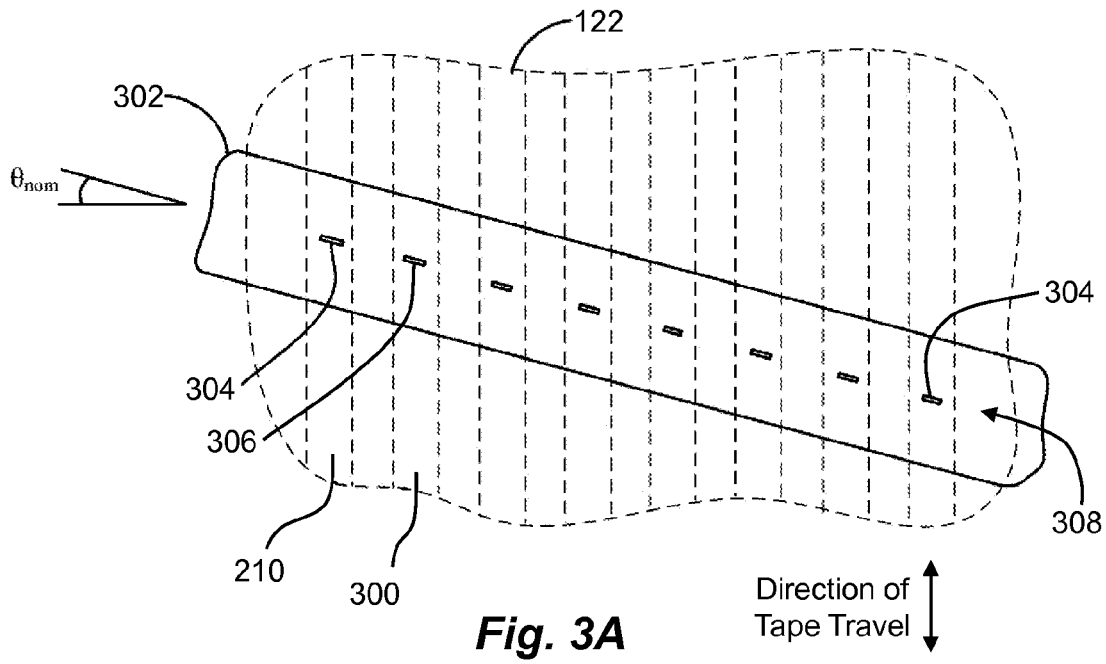
FIGS. 3A-3C illustrate how tape lateral expansion and contraction may be compensated for by adjusting azimuth angle of a tape head, in accordance with an embodiment of the present invention.
Figure 3B:
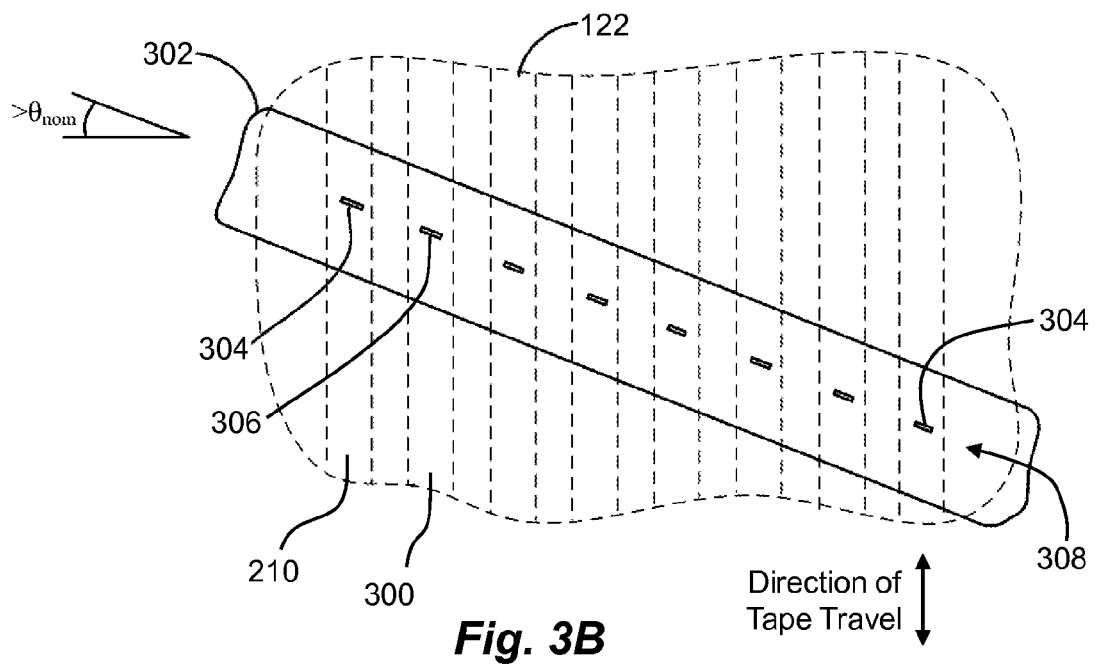
Figure 3C:
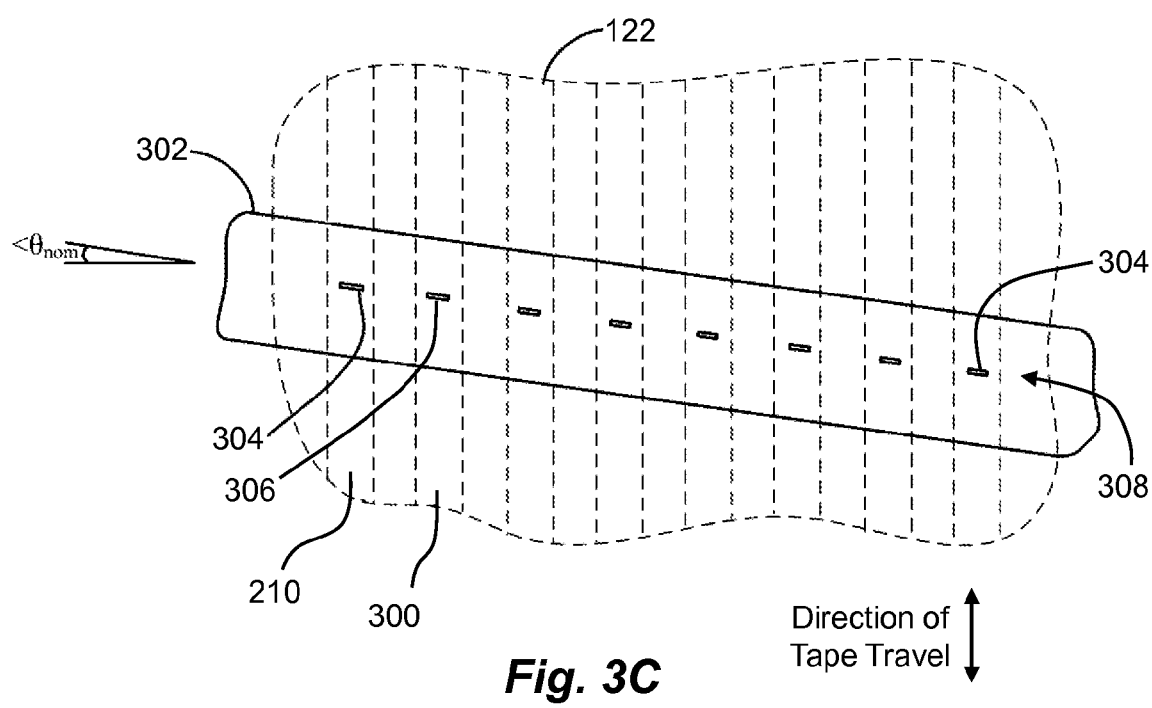

FIGS. 3A, 3B, and 3C illustrate how tape lateral expansion and contraction may be compensated for by adjusting azimuth angle θ of a tape head 302, in accordance with an embodiment of the present invention. FIGS. 3A, 3B, and 3C show tape 122 with servo tracks 210 and data tracks 300, and tape head 302 with read and/or write heads 308, showing in this example servo read or write heads 304 and data read heads 306. As indicated, the direction of tape travel is longitudinally in the direction of the data and servo tracks, and tape head 302 is disposed predominantly laterally across tape 122.

In various embodiments, compensating for tape lateral expansion and contraction is achieved by adjusting azimuth angle θ of tape head 302 with respect to the latitudinal axis of tape 122, thereby altering the relative spacing of read and/or write heads 308, as projected in the direction of tape travel of the tape over read and/or write heads 308. Generally, the projected relative spacing of read and/or write heads 308 is governed by the product of the cosine of θ and the actual spacing of read and/or write heads 308 on tape head 302. In one embodiment, to compensate for tape lateral expansion and contraction, tape head 302 is set to a nominal azimuth angle $\theta_{nom}$ based, for example, on a nominal servo track and data track spacing defined in a specification or standard associated with the tape technology. Adjustments may be made to azimuth angle θ to keep the projected relative spacing of read and/or write heads 308 aligned with servo tracks 210 and data tracks 300 of tape 122. This solution is represented for a single chip 204 in FIGS. 3A, 3B, and 3C.

FIG. 3A shows tape head 302 relative to tape 122, where the tape has a nominal width. As shown, servo read or write heads 304 and data read heads 306 are aligned with servo tracks 210 and data tracks 300, respectively, on tape 122. Tape head 302 is at an azimuth angle $\theta_{nom}$. FIG. 3B shows tape head 302 adjusted to an angle greater than azimuth angle $\theta_{nom}$ to compensate for tape lateral contraction. FIG. 3C shows tape head 302 adjusted to an angle less than azimuth angle $\theta_{nom}$ to compensate for tape lateral expansion. In the embodiment illustrated in FIG. 2, which includes two chips 204, each having a tape head assembly, a coupling arrangement between the two chips 204 may be used to ensure that both modules maintain the same azimuth angle when adjustments to the angle are made.

Figure 4:
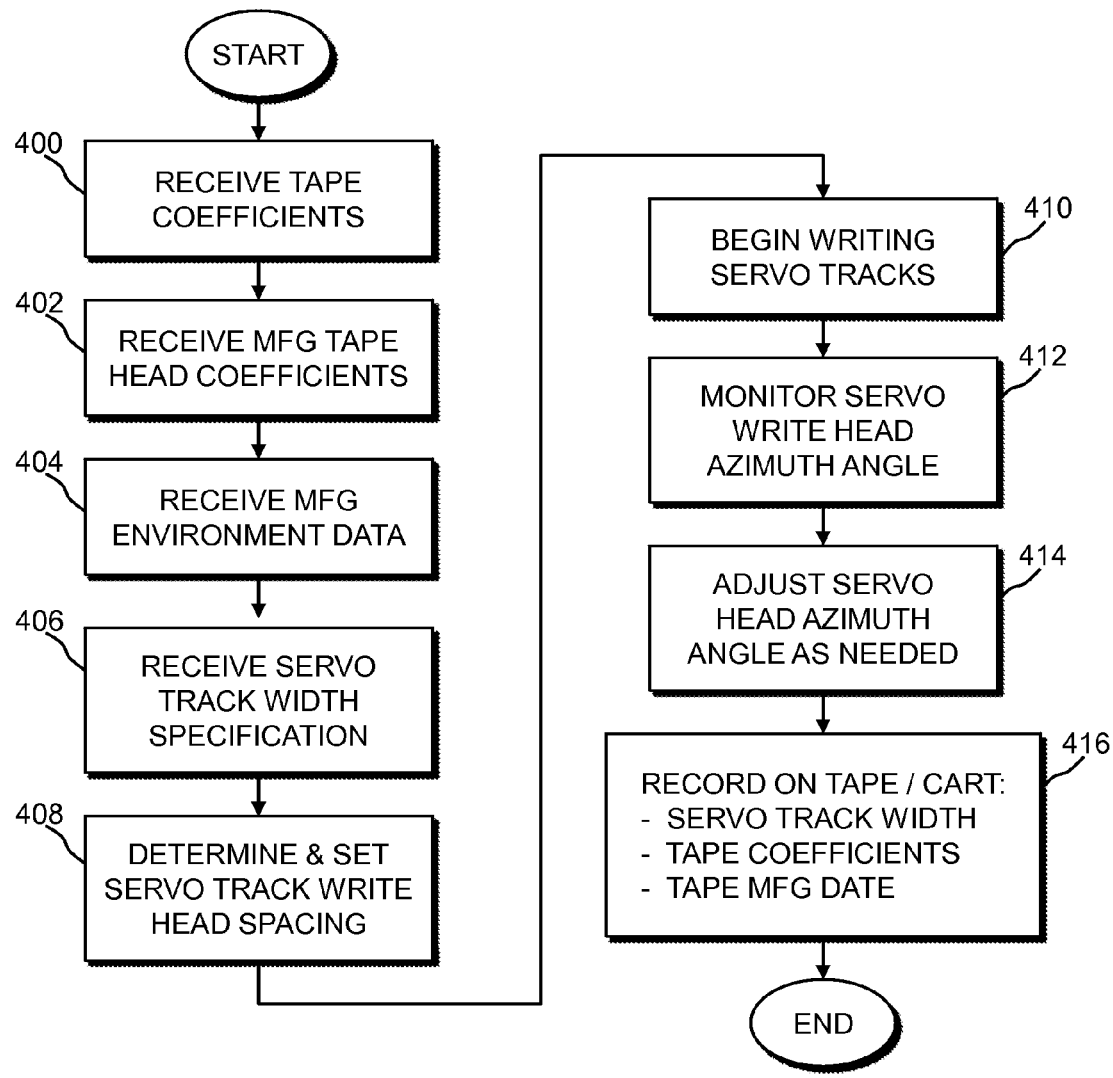
FIG. 4 is a flowchart illustrating operational steps of a servo write head compensation system, in accordance with an embodiment of the present invention.

FIG. 4 is a flowchart illustrating operational steps of a servo write head compensation system, in accordance with an embodiment of the present invention. In this embodiment, a tape is loaded into a tape drive for a servo track write operation. The tape drive is typically a dedicated servo track writer. The servo tracks are typically written onto tape that is stored on large reels, and is then spooled into, for example, smaller tape cartridges. In the embodiment, the servo track writer system may receive several pieces of manufacturing set-up data. The system may receive data corresponding to the coefficients of thermal and hygroscopic expansion for the tape 122 (step 400). This data may be retrieved, for example, from a data store associated with the tape manufacturing process, for example, a data store on the host computer, or may be hard coded in the system. This information is typically defined by the standard associated with the tape technology. Similarly, the system may receive data corresponding to the coefficients of thermal and hygroscopic expansion for the substrate of tape head 126 (step 402). In certain embodiments, the coefficient of hygroscopic expansion for the substrate of the tape head may be ignored because the substrate may absorb little to no moisture, and this coefficient can be treated as zero. The system also receives environmental data, for example, the temperature and humidity, for the manufacturing environment (step 404). This data is received, for example, from the environmental sensors of tape drive 100.

The system also receives, or has hard coded information about, the servo track width specification for tape 122 (step 406). The servo track width is typically the nominal servo track spacing defined in a specification or standard associated with the tape technology. In a preferred embodiment, the servo track width specification includes the associated temperature and humidity at which the nominal servo track spacing is measured.

In this embodiment, after the manufacturing set-up data has been received, a servo write head spacing is determined such that the servo track spacing will be at the nominal value when the tape is brought to a nominal temperature and humidity. During servo track writing, the servo write head spacing may be set to the determined value by, for example, adjusting the azimuth angle of write head 126 (step 408). For example, if the temperature and humidity of the manufacturing environment is the same as the nominal temperature and humidity at which the nominal servo track spacing is measured, the servo write head spacing can be set to the nominal servo track spacing defined in the specification or standard associated with the tape technology. If the temperature and humidity of the manufacturing environment is different than the nominal temperature and humidity, the change in the width dimension of the tape and the longitudinal dimension of the tape head resulting from the difference in temperature and humidity is determined, based on the received tape and tape head coefficients, and adjustments are made to the servo write head spacing, for example, by adjusting the azimuth angle of tape head 126. In certain embodiments, the servo track spacing may be adjusted by adjusting the tension of the tape at the servo write heads. The extent of adjustment to the servo track spacing on a tape may be determined, for example, by Poisson's ratio for the tape, and the maximum allowable tension set in the tape specification.

For example, the differences between the temperature and humidity of the manufacturing environment and nominal temperature and humidity may be represented by the following equations:

$$\Delta T = (\text{mfg temp}) - (\text{nominal temp})$$

$$\Delta H = (\text{mfg humidity}) - (\text{nominal humidity})$$

The dimensional change in the tape servo track spacing between the manufacturing environment and an environment at the nominal temperature and humidity may be represented by the following equation:

$$\Delta L_{TAPE} = \Delta T(\text{tape coeff}(T)) + \Delta H(\text{tape coeff}(H))$$

where "tape coeff(T)" and "tape coeff(H)" represent the coefficients of thermal and hygroscopic expansion, respectively, of the tape substrate, and the coefficients have dimensions of [length/temperature] and [length/humidity], respectively.

Similarly, the dimensional changes in the target tape head substrate between the manufacturing environment and an environment at the nominal temperature and humidity may be represented by the following equation:

$$\Delta L_{HEAD} = \Delta T(\text{target tape head coeff}(T)) + \Delta H(\text{target tape head coeff}(H))$$

A servo write head spacing may be determined by the following equation:

$$\text{Servo Spacing} = (\text{Nominal Spacing}) + \Delta L_{TAPE} - \Delta L_{HEAD}$$

Thus, a servo write head spacing can be based on the nominal spacing, adjusted for the differential difference in dimensional changes to the tape and the manufacturing tape drive tape head due to the difference between the temperature and humidity of the target environment and the nominal temperature and humidity.

In certain implementations, the environment in which a tape has been stored awaiting the writing of servo tracks, in relation to the time the tape is in the manufacturing environment of tape drive 100, may have a higher importance in determining the servo write head spacing. For example, if a tape has reached an equilibrium state with respect to the temperature and humidity of a storage environment and the tape is then moved to a manufacturing environment with a different temperature and humidity from the storage environment, but one in which the tape will be exposed to for only a short period of time during the writing of the servo tracks, the temperature and humidity of the storage environment may have a higher weighting in determining the servo write head spacing than the temperature and humidity of the manufacturing environment.

After the servo write head spacing has been set (see step 408), servo tracks are written to the tape (step 410). During the writing of the servo tracks, the azimuth angle (and/or the tape tension at the servo write head) may be monitored (step 412). If deviations from the determined azimuth angle (or tape tension) are detected, adjustments to the servo write head spacing may be made as needed (step 414).

As part of the servo track writing process, various data related to the process may optionally be recorded to a data store (step 416). In one embodiment, the following data may be written: the nominal servo track spacing and the nominal temperature and humidity; the tape coefficients of temperature and humidity; and the tape manufacturing date. The data may be recorded to the media auxiliary memory of a tape cartridge, such as the cartridge memory of the Linear Tape-Open (LTO) standard for magnetic tape data storage. Alternatively, the data may be recorded to a data structure on the tape itself, for example, to the tape header or to a special purpose dataset on the tape, or stored in a dataset on a computer-readable tangible storage medium on a host computing system and accessible to a tape drive via, for example, an interface, such as interface 134. In certain embodiments, the nominal servo track spacing, the nominal temperature and humidity, and the tape coefficients of temperature and humidity are not written to the tape or tape cartridge because these values may be defined by the standard associated with the tape technology, and may be, for example, hard coded in the system, or stored in a data store of the system.

In certain embodiments, the manufacturing environmental conditions may be continuously monitored (see, e.g., step 404), and if changes are detected during the servo track writing operation, adjustments can be made to the servo write head spacing set point (see, e.g., step 408), via, for example, the servo write head azimuth angle, to compensate for changes in tape dimension resulting from the changes in manufacturing environmental conditions.

Figure 5:
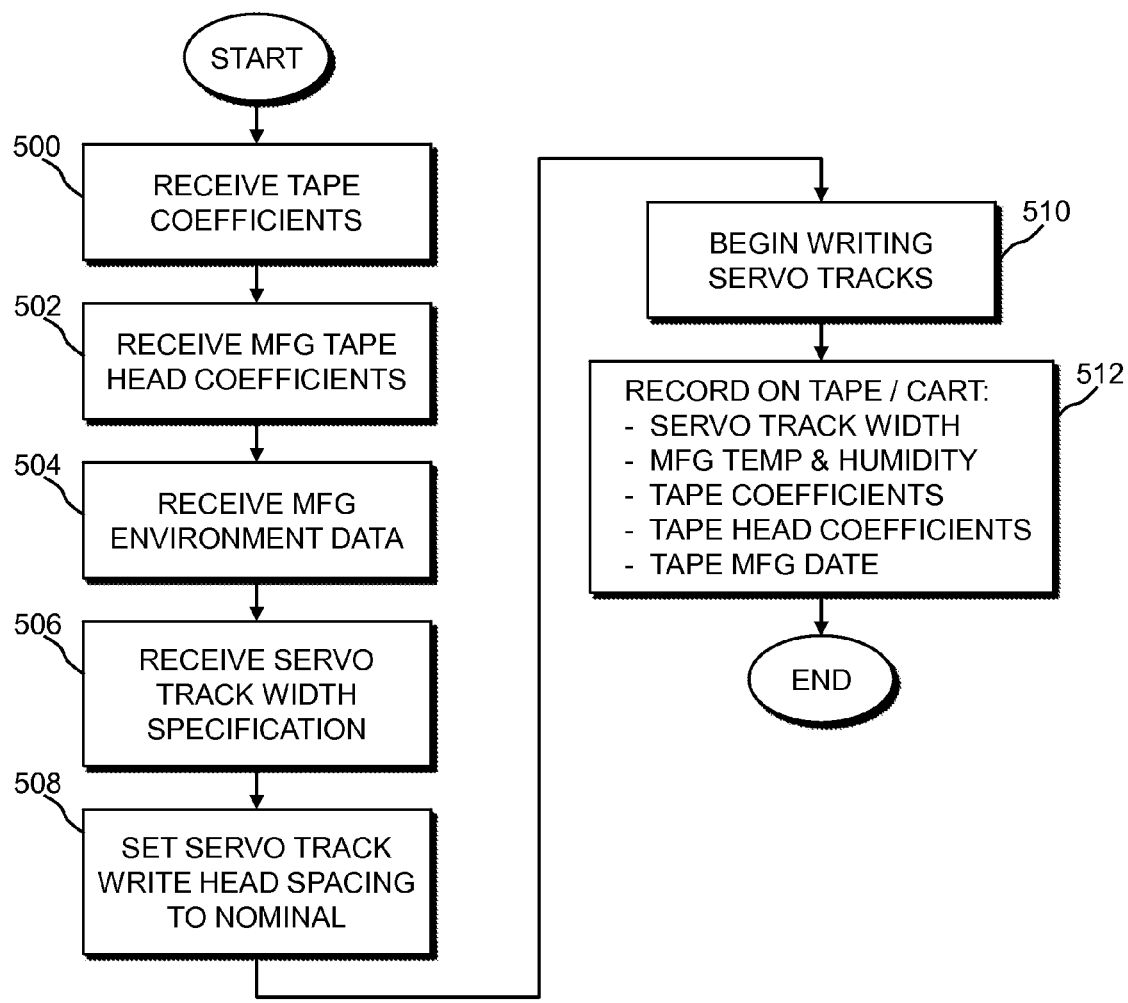
FIG. 5 is a flowchart illustrating operational steps of a second servo write head compensation system, in accordance with an embodiment of the present invention.

FIG. 5 is a flowchart illustrating operational steps of a second servo write head compensation system, in accordance with another embodiment of the present invention. In this embodiment, when a servo track write operation is requested on a servo track writer, the system may receive several pieces of data. The system may receive data corresponding to the coefficients of thermal and hygroscopic expansion for the tape 122 (step 500). This data may be retrieved, for example, from a data store associated with the tape manufacturing process, for example, a data store on the host computer, or may be hard coded in the system. This information is typically defined by the standard associated with the tape technology. Similarly, the system may receive, or have hard coded information about, data corresponding to the coefficients of thermal and hygroscopic expansion for the substrate of tape head 126 (step 502). As described above, the coefficient of hygroscopic expansion for the substrate of the tape head may be ignored, as it typically is very close to zero. While this data is not needed during the tape servo track writing process, it may optionally be written to the tape or tape cartridge, as described below.

The system also receives environmental data, for example, the temperature and humidity, for the manufacturing environment (step 504). This data is received, for example, from the environmental sensors of tape drive 100. The system may also receive, or have hard coded information about, the servo track width specification for tape 122 (step 506). The servo track width is typically the nominal servo track spacing defined in a specification or standard associated with the tape technology. In a preferred embodiment, the servo track width specification includes the associated temperature and humidity at which the nominal servo track spacing is measured.

In this embodiment, the servo write head spacing is set to the nominal value, regardless of the manufacturing environment temperature and humidity, by, for example, adjusting the azimuth angle of write head 126 (step 508). In other embodiments, the servo write head assembly may, for example, be fixed at the nominal spacing, for example, bolted on place. After the servo write head spacing has been set, servo tracks are written to the tape (step 510). As part of the servo track writing process, various data related to the process is recorded to a data store (step 512). In this exemplary embodiment, the following data may be written: the nominal servo track spacing and the nominal temperature and humidity; the manufacturing environment temperature and humidity; the tape and tape head coefficients of temperature and humidity; and the tape manufacturing date. The data may be recorded to the media auxiliary memory of a tape cartridge, such as the cartridge memory of the Linear Tape-Open (LTO) standard for magnetic tape data storage. Alternatively, the data may be recorded to the tape itself, for example, to the tape header or to a special purpose dataset on the tape, or stored in a dataset on a computer-readable tangible storage medium on a host computing system and accessible to a tape drive via, for example, an interface, such as interface 134.

Figure 6:
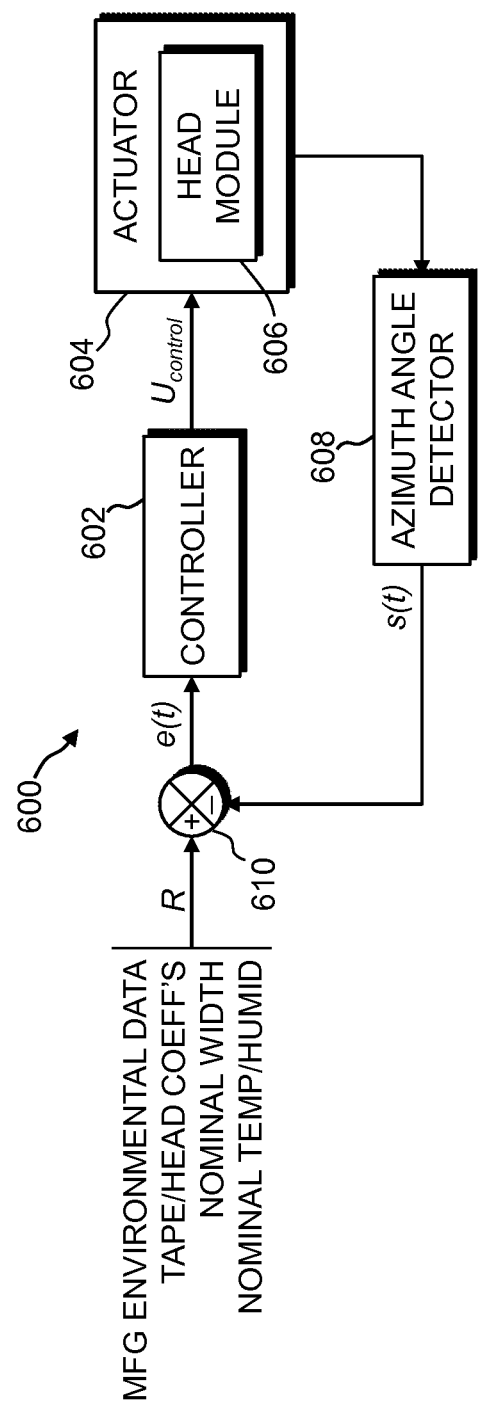
FIG. 6 illustrates a simplified block diagram of a servo control system for controlling the spacing of servo write heads, in accordance with an embodiment of the present invention.

FIG. 6 illustrates a simplified block diagram of a servo control system 600 for controlling the writing of servo tracks to a tape, in accordance with an embodiment of the present invention as described with relation to the flowchart of FIG. 4. In this servo control system, spacing of servo write heads during the tape manufacturing process is adjusted from the nominal spacing based on differences between the nominal temperature and humidity and the manufacturing environment temperature and humidity (see step 408, FIG. 4). Initial servo write head spacing is determined by a reference signal R derived from the manufacturing environmental data, such as the temperature and humidity, the temperature and humidity coefficients of expansion for the tape and tape head, the nominal width of the servo tracks, and the associated nominal temperature and humidity.

Based on reference signal R, controller 602 generates a control signal $U_{control}$ to actuator 604 to set, for example, the azimuth angle of the tape head of head module 606 such that the servo head spacing is set to, for example, the nominal spacing. An azimuth angle detector 608 may monitor the azimuth angle of tape head module 606, and provide a feedback signal s(t) that indicates deviation from the desired azimuth angle. Signal s(t) is combined with reference signal R via subtracter 610 to generate azimuth angle error signal e(t), which is used by controller 602 to make required adjustments to, for example, the tape head azimuth angle of head module 606 via control signal $U_{control}$ to t actuator 604. In certain embodiments, setting and adjusting of the tape servo track spacing as the servo tracks are written to the tape may be controlled, for example, by one or both of adjusting the azimuth angle, and tape tension.

In certain embodiments, the manufacturing environmental conditions can be continuously monitored, and detected changes may be used to adjust reference signal R.

When a tape manufactured in accordance with an embodiment described in relation to FIGS. 4 and 6 is loaded into a tape drive, for example, tape drive 100, for routine data write and read operations, the tape drive can, for example, determine a servo head spacing set point, based on the nominal servo track spacing and the associated nominal temperature and humidity, and adjustments to the nominal spacing based on tape coefficients, coefficients of the tape head that is reading the tape, and differences between the temperature and humidity in the target environment at which the servo tracks are read from the tape and the nominal temperature and humidity. As mentioned above, the nominal servo track spacing, the associated nominal temperature and humidity, and the tape coefficients, are typically associated with a tape standard. The tape drive, for example, tape drive 100, may include hard coded information regarding these values, these values may be stored on a computer readable tangible storage device, these values may be written to the tape or tape cartridge, or a combination of these.

For example, the differences between the temperature and humidity of the target environment in which, for example, tape 100 operates, and the nominal temperature and humidity may be represented by the following equations:

$\Delta T$=(target temp)−(nominal temp)

$\Delta H$=(target humidity)−(nominal humidity)

The dimensional change in the tape servo track spacing between the target environment and an environment at the nominal temperature and humidity may be represented by the following equation:

$\Delta L_{TAPE} = \Delta T(\text{tape coeff}(T)) + \Delta H(\text{tape coeff}(H))$ where "tape coeff(T)" and "tape coeff(H)" represent the coefficients of thermal and hygroscopic expansion, respectively, of the tape substrate, and the coefficients have dimensions of [length/temperature] and [length/humidity], respectively.

Similarly, the dimensional changes in the target tape head substrate between the target environment and an environment at the nominal temperature and humidity may be represented by the following equation:

$\Delta L_{HEAD} = \Delta T(\text{target tape head coeff}(T)) + \Delta H(\text{target tape head coeff}(H))$ A servo read head spacing set point may be determined by the following equation:

$$\text{Set Point} = (\text{Nominal Spacing}) + \Delta L_{TAPE} - \Delta L_{HEAD} \qquad (1)$$

Thus, a set point can be based on the nominal spacing, adjusted for the differential difference in dimensional changes to the tape and the target tape drive tape head due to the difference between the temperature and humidity of the target environment and the nominal temperature and humidity.

Figure 7:
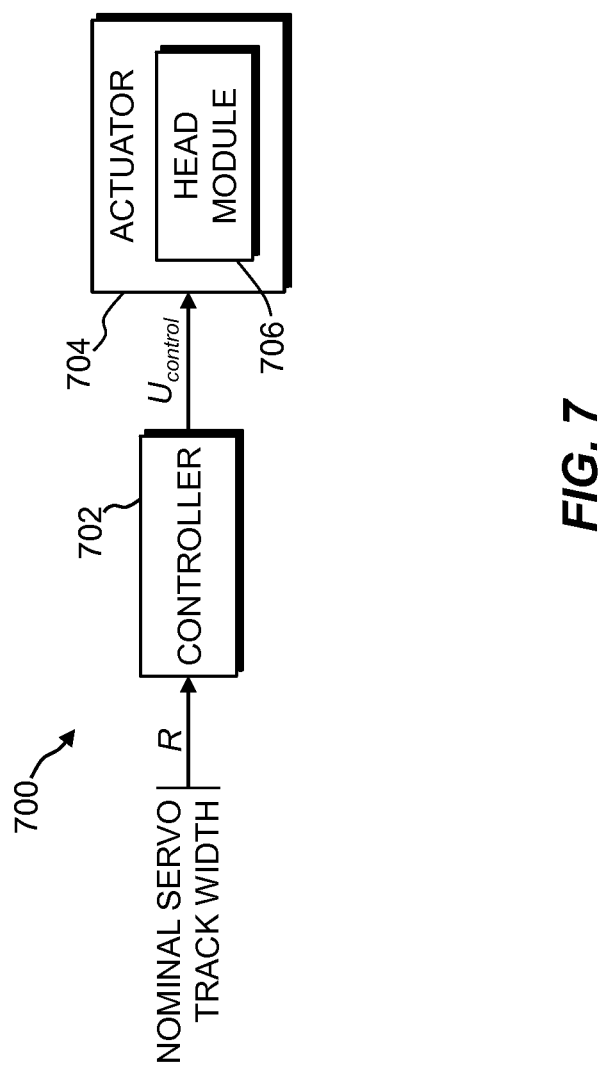
FIG. 7 illustrates a simplified block diagram of a second servo control system for controlling the spacing of servo write heads, in accordance with an embodiment of the present invention.

FIG. 7 illustrates a simplified block diagram of a servo control system 700 that may be used for controlling the servo write head spacing, in accordance with an embodiment of the present invention as described with relation to the flowchart of FIG. 5. In this open loop servo control system, the servo write head spacing is set to the nominal value, regardless of the manufacturing environment temperature and humidity, by, for example, adjusting the azimuth angle of write head 126 (see step 508, FIG. 5). Initial servo write head spacing is determined by a reference signal R derived from the nominal servo track width. Based on reference signal R, controller 702 generates a control signal $U_{control}$ to actuator 704 to set, for example, the azimuth angle of the tape head of head module 706 such that the servo write head spacing is set to the nominal spacing. As mentioned above, in certain embodiments, the servo write heads may be fixed in place at the nominal servo track width, and a servo control system is not used.

When a tape manufactured in accordance with an embodiment described in relation to FIGS. 5 and 7 is loaded into a tape drive, for example, tape drive 100, for routine data write and read operations, the tape drive can, for example, determine a servo head spacing set point, based on the nominal servo track spacing and the associated nominal temperature and humidity, and adjustments to the nominal spacing based on tape coefficients, coefficients of the manufacturing tape head and the tape head that is reading the tape, and differences between the temperature and humidity in the target environment at which the servo tracks are read from the tape and the manufacturing temperature and humidity at which the servo tracks were written. As mentioned above, the nominal servo track spacing, the associated nominal temperature and humidity, and the tape coefficients, are typically associated with a tape standard. The tape drive, for example, tape drive 100, may include hard coded information regarding these values, these values may be stored on a computer readable tangible storage device, these values may be written to the tape or tape cartridge, or a combination of these.

For example, similar to the derivation of equation (1) above, the differences between the temperature and humidity of the environment target and manufacturing temperature and humidity may be represented by the following equations:

$$\Delta T = (\text{target temp}) - (\text{mfg temp})$$

$$\Delta H = (\text{target humidity}) - (\text{mfg humidity})$$

The dimensional changes in the tape servo track spacing and the dimensional changes in the target tape head substrate between the target environment and the manufacturing environment may be represented by the following equations:

$$\Delta L_{TAPE} = \Delta T(\text{tape coeff}(T)) + \Delta H(\text{tape coeff}(H))$$

$$\Delta L_{HEAD} = \Delta T(\text{target tape head coeff}(T)) + \Delta H(\text{target tape head coeff}(H))$$

Similar to above, a servo read head spacing set point may be determined by the following equation:

$$\text{Set Point} = (\text{Nominal Spacing}) + \Delta L_{TAPE} - \Delta L_{HEAD} \quad (2)$$

In certain embodiments, a servo read head spacing set point may also be based on the age of the tape, determined, for example, from the date of manufacture recorded in a data store, and the corresponding non-uniform effect on tape width, as a function of tape longitudinal position, caused by pack pressure. As described above, as a tape ages, tape at the inner diameters of the cartridge typically becomes wider than tape at the outer diameters due to differences in pack pressure. This effect is non-linear with respect to age, and tends to stabilize after a period of time. For example, an empirical relationship can be determined between the age of a tape and the change in tape width as a function of tape longitudinal position caused by pack pressure, by examining tapes of different ages. Tapes having different tape materials and compositions may exhibit varying effects due to pack pressure. Changes in width due to pack pressure may be added to the right side of equations (1) or (2) to arrive at a set point value.

As will be appreciated by one skilled in the art, aspects of the present invention may be embodied as a system or method. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

Any flowcharts and block diagrams in the Figures illustrate the architecture, functionality, and operation of possible implementations of systems, methods and computer program products according to various embodiments of the present invention. In this regard, each block in a flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

What is claimed is:

1. A computer program product for recording a servo write head spacing for writing servo tracks on a magnetic tape in a manufacturing environment, the computer program product comprising:
   one or more non-transitory computer-readable storage media and program instructions stored on the one or more non-transitory computer-readable storage media, the program instructions comprising:
   program instructions to receive, by one or more processors, one or more environmental condition measurements of the manufacturing environment;
   program instructions to write a pair of servo tracks on a magnetic tape by a pair of servo write heads at a nominal spacing; and
   program instructions to record in one or more data stores the one or more environmental condition measurements of the manufacturing environment, and information pertaining to the spacing of the servo tracks on the magnetic tape.

2. A computer program product in accordance with claim 1, wherein the information pertaining to the spacing of the servo tracks includes one or more of:
   the nominal spacing of the servo write heads; a coefficient of thermal expansion for the magnetic tape;
   a coefficient of hygroscopic expansion for the magnetic tape; a coefficient of thermal expansion for a substrate of the servo write heads; and
   a coefficient of hygroscopic expansion for a substrate of the servo write heads.

3. A computer program product in accordance with claim 1, further comprising:
   program instructions to write two or more servo tracks on the tape with at least the pair of servo write heads, the pair of servo write heads located within the manufacturing environment.

4. A computer program product in accordance with claim 1, wherein a data store is one of:
   media auxiliary storage of a tape cartridge of the tape; a magnetic data written on the tape; and a dataset on a computer-readable tangible storage medium on a host computing system.

5. A computer system for recording a servo write head spacing for writing servo tracks on a magnetic tape in a manufacturing environment, the computer system comprising:
   one or more computer processors, one or more computer-readable storage media, and program instructions stored on one or more of the computer-readable storage media for execution by at least one of the one or more processors, the program instructions comprising:
   program instructions to receive, by one or more processors, one or more environmental condition measurements of the manufacturing environment;
   program instructions to write a pair of servo tracks on a magnetic tape by a pair of servo write heads at a nominal spacing; and
   program instructions to record in one or more data stores the one or more environmental condition measurements of the manufacturing environment, and information pertaining to the spacing of the servo tracks on the magnetic tape.

6. A computer system in accordance with claim 5, wherein the information pertaining to the spacing of the servo tracks includes one or more of:
   the nominal spacing of the servo write heads; a coefficient of thermal expansion for the magnetic tape;
   a coefficient of hygroscopic expansion for the magnetic tape;
   a coefficient of thermal expansion for a substrate of the servo write heads; and
   a coefficient of hygroscopic expansion for a substrate of the servo write heads.

7. A computer system in accordance with claim 5, further comprising:
   program instructions to write two or more servo tracks on the tape with at least the pair of servo write heads, the pair of servo write heads located within the manufacturing environment.

8. A computer system in accordance with claim 5, wherein a data store is one of:
   media auxiliary storage of a tape cartridge of the tape; a magnetic data written on the tape; and a dataset on a computer-readable tangible storage medium on a host computing system.

\* \* \* \* \*